United States Patent [19]

Extance et al.

[11] Patent Number: 4,919,099
[45] Date of Patent: Apr. 24, 1990

[54] COMBUSTION MONITORING

[75] Inventors: Philip Extance; Roger J. Hazelden, both of Solihull; David Nutton, Barnsley, all of Great Britain

[73] Assignee: Lucas Industries PLC, Birmingham, England

[21] Appl. No.: 167,694

[22] Filed: Mar. 14, 1988

[30] Foreign Application Priority Data

Mar. 12, 1987 [GB] United Kingdom ............... 8705905

[51] Int. Cl.$^5$ .................... G01M 15/00; F02D 41/14; F02P 5/145
[52] U.S. Cl. .................................. 123/425; 123/435; 123/494; 73/35; 73/116
[58] Field of Search ................. 123/425, 435, 494; 73/35, 116

[56] References Cited

U.S. PATENT DOCUMENTS

| | | | |
|---|---|---|---|
| 3,067,610 | 12/1962 | Bockemuehl et al. | 73/35 |
| 4,358,952 | 11/1982 | Maurer et al. | 73/35 |
| 4,381,748 | 5/1983 | Eckert et al. | 123/494 |
| 4,393,687 | 7/1983 | Müller et al. | 73/35 |
| 4,444,043 | 4/1984 | Hattori et al. | 73/35 |
| 4,463,733 | 8/1984 | Tsai | 123/425 |
| 4,658,642 | 4/1987 | Ikeda | 123/494 |
| 4,799,455 | 10/1988 | Kuroiwa et al. | 73/116 |

FOREIGN PATENT DOCUMENTS 60-17239  1/1985  Japan ................... 123/425

Primary Examiner—Andrew M. Dolinar
Attorney, Agent, or Firm—Fleit, Jacobson, Cohn, Price, Holman & Stern

[57] ABSTRACT

A method of monitoring combustion within a cylinder of a reciprocating piston internal combustion engine comprising deriving first and second electrical signals representative of light intensity within the cylinder by means of first and second optical transducers of spaced spectral response, said first and second optical transducers observing the combustion event at a common location, or at closely adjacent locations, and, establishing a signal representing the ratio of said first and second electrical signals, said ratio signal being used as, or to obtain, a control parameter for an engine control system. The invention also resides in apparatus for monitoring combustion in accordance with the above method.

14 Claims, 6 Drawing Sheets

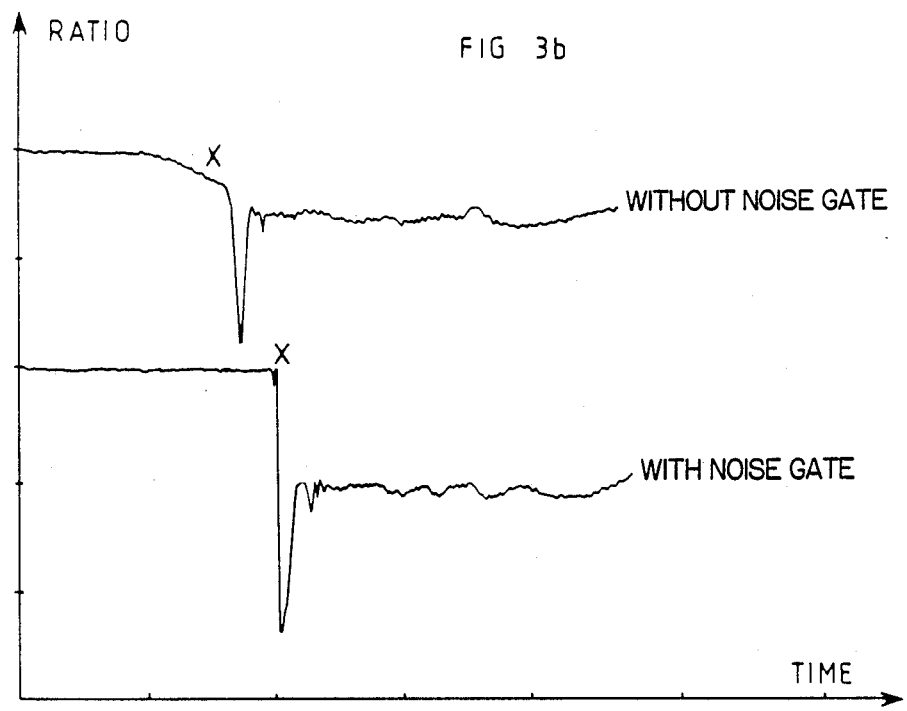
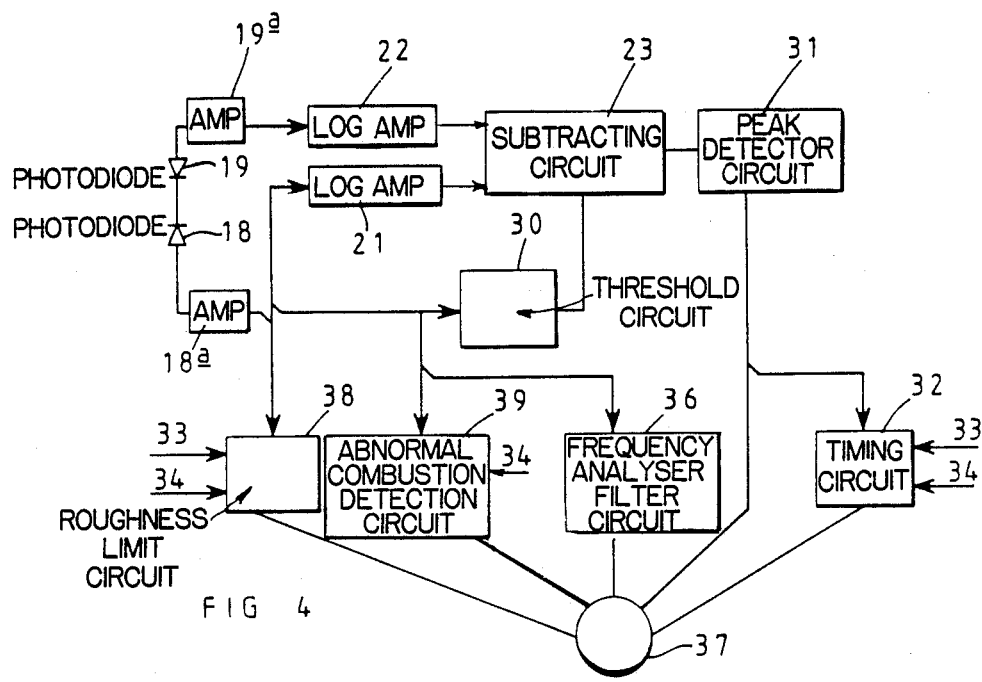

COMBUSTION MONITORING

BACKGROUND OF THE INVENTION

This invention relates to monitoring of combustion in a cylinder of a reciprocating piston internal combustion engine.

A primary purpose of monitoring combustion within a cylinder of a reciprocating piston internal combustion engine is to ascertain the crank-shaft position at which combustion of fuel within the cylinder commences. The point in the operation of the engine at which combustion commences is an important parameter in the control of engine operation by means of a closed- or open-, loop feedback control system of an engine, and U.S. Pat. specification No. 4,381,748 discloses engine control systems using the start of combustion as a main control parameter. The start of combustion is not the only parameter which may be used by an engine control or engine management system and other composition related control parameters include the pressure within the cylinder and the combustion temperature.

It is known, at least from U.S. Pat. No. 4,381,748, to monitor the combustion within an engine cylinder by optical means. In U.S. Pat. No. 4,381,748 a phototransistor is disposed at the exterior of a transparent window in the wall of the cylinder and monitors light intensity within the cylinder. Such an arrangement however has significant disadvantages. Firstly, it is recognized that the peak light intensity will vary from cycle to cycle of the engine, and thus in order to determine satisfactorily the point at which a signal representative of for example the start of combustion is passed to the control system it is necessary to establish, over a predetermined number of cycles, an average peak intensity, and then to pass a signal to the control system when the light intensity perceived by the photo-transistor achieves a predetermined percentage of the average peak intensity. The time constant which occurs in the system in order to permit calculation of an average peak intensity slows down the system response and thus the control system cannot respond rapidly to engine operating changes, and may not cope adequately with transient changes.

Naturally the window in the cylinder wall will become contaminated during operation of the engine and such contamination will alter the light intensity perceived by the photo transistor. Such changes in perceived intensity can give rise to the control system effecting non-optimum control of the engine operation.

British Patent No. 2,098,756 also discloses a system which monitors light intensity in a cylinder of an engine but differing from U.S. Pat. No. 4,381,748 in that the intensity of a plurality of predetermined wavelengths is monitored. It is to be expected therefore that the system of British Patent No. 2,098,756 will suffer from the disadvantages mentioned above in relation to U.S. Pat. No. 4,381,748.

SUMMARY OF THE INVENTION

It is an object of the present invention to provide a method and apparatus for combustion monitoring wherein the above disadvantages are minimized.

In accordance with the present invention there is provided a method of monitoring combustion within a cylinder of a reciprocating piston internal combustion engine comprising deriving first and second electrical signals representative of light intensity within the cylinder by means of first and second optical transducers of spaced spectral response, said first and second optical transducers observing the combustion event at a common location, or at closely adjacent locations, and, establishing a signal representing the ratio of said first and second electrical signals, said ratio signal being used as, or to obtain, a control parameter for an engine control system.

Conveniently said signal representing said ratio is a logarithm of the ratio.

Said signal representing said ratio has a fast rising leading edge and desirably said fast rising leading edge is used to obtain said engine control parameter.

Conveniently said engine control parameter is derived from the differential of said signal representing said ratio.

Alternatively, said engine control parameter is obtained by observing when the value of said signal representing said ratio exceeds a predetermined value.

Desirably, where the engine is a compression ignition engine (self igniting/diesel engine) the function which is controlled is the point in the engine cycle at which fuel is injected into the cylinder.

Desirably, where the engine is a spark ignition engine the functions which are controlled are the point in the engine cycle at which the ignition spark is generated and the air fuel ratio.

In a spark ignition engine the signal representing said ratio is found to exhibit a minimum immediately following the peak of the fast rising leading edge.

Preferably said minimum following the peak of said fast rising leading edge is used to effect control over the engine fuel/air ratio.

The invention further resides in apparatus for monitoring combustion in a cylinder of a reciprocating piston internal combustion engine, the apparatus comprising light conduction means having one end exposed within the combustion space of the cylinder of an internal combustion engine, and its opposite end communicating with first and second optical transducers of spaced spectral response, and, means for establishing a signal representing the ratio of the electrical signals produced by said first and second transducers, and for producing an output signal derived from said ratio signal.

It will be recognized that the use of transducers of different spectral response, and the derivation of an output signal from the ratio of the outputs of the two transducers is a totally different connect to that disclosed in U.S. Pat. No. 4,381,748. Taking a somewhat simplistic view, the disclosure in U.S. Pat. No. 4,381,748 is of the concept of monitoring the intensity of light emitted during the combustion event whereas the present invention monitors the "colors" of the light emitted during the combustion event. The term "color" is to be construed broadly, and not to be construed as restricted to radiations in the visible spectrum.

While the start of combustion is an extremely important parameter, particularly within the control of a self-igniting engine (for example a diesel engine) it is not the sole parameter of importance.

In a further aspect of the present invention there is provided a method and apparatus for monitoring the oxides of nitrogen (NOx) content of an engine exhaust, the method and apparatus being as specified previously, it having been determined that the magnitude of the ratio signal is directly related to the NOx content of the engine exhaust.

BRIEF DESCRIPTION OF THE DRAWINGS

One example of the invention is illustrated in the accompanying drawings wherein FIG. 3b is a graphic illustration of the use of the modified system of FIG. 2b, FIG. 4 is a view similar to FIG. 2 of a monitoring system associated with an engine control for a spark ignition internal combustion engine.

DETAILED DESCRIPTION OF THE INVENTION

Figure 1:
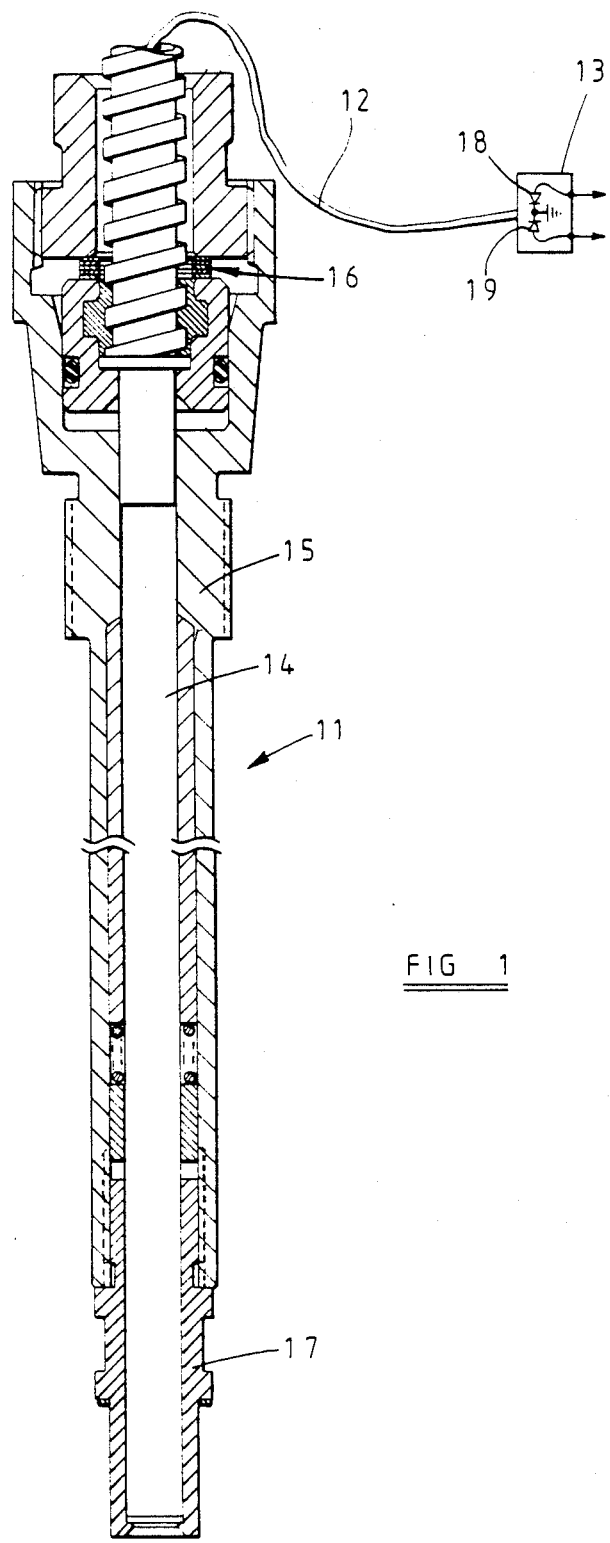
FIG. 1 is a cross-sectional view of an optical sensor probe.
Figure 2A:
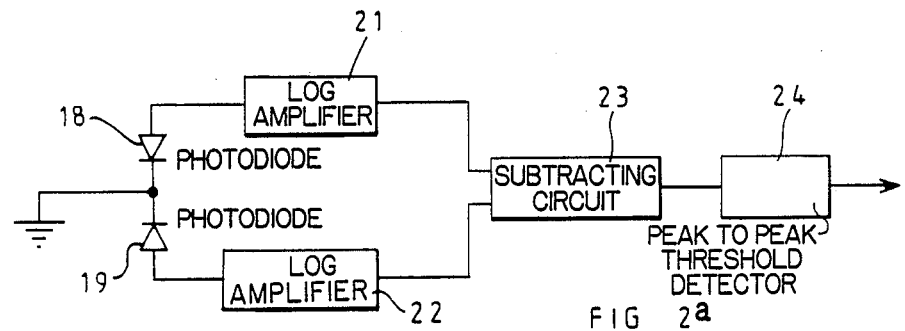
FIG. 2a is a diagrammatic representation of a pair of optical transducers and associated means for deriving a ratio signal.

Referring first to FIGS. 1 to 3 of the drawings, apparatus for monitoring combustion within a cylinder of a reciprocating piston internal combustion engine comprises an optical probe 11 connected by means of an optical fiber bundle 12 or the like to an optical transducer assembly 13. It should be noted that the means of transmitting light from the probe 11 to the transducer 13 is not of importance to the present invention, and any of the widely recognized optical conductor arrangements can be utilized. Furthermore, it might prove possible to mount the transducer 13 directly on the probe 11 provided that the temperature of the probe can be maintained at a satisfactory level. The probe extends through the outer wall of the cylinder so as to communicate with the combustion space in the cylinder, and preferably the probe will be mounted in the cylinder head of the engine. The probe 11 comprises an optically conductive rod 14 received within a multi-part metal carrier 15 whereby the probe is sealingly engaged with the wall of a passage extending through the cylinder wall (conveniently a screw threaded passage in the cylinder head). The rod 14 is exposed at one end to the combustion space within the cylinder, and thus light and similar electromagnetic radiation emitted during combustion within the cylinder is conducted by the rod 14 and the fiber bundle 12 if used, to the transducer 13. Clearly the probe may take a number of different forms, but in a convenient form, as illustrated in FIG. 1, the rod 14 is resiliently mounted within the carrier 15 and is spring loaded against the inner end of the carrier 15 by means of spring washers 16. The inner-most end region 17 of the carrier 15 is formed from a material resistant to the temperature and atmospheric conditions which arise within the combustion space of the cylinder. Furthermore, the rod 14 is externally arranged to ensure total internal reflection within the rod and thus a high degree of optical conduction between the ends of the rod. Alternatively the rod may comprise a high temperature resistant transparent rod of, for example, fused silica.

The transducer assembly 13 comprises first and second photodiodes 18, 19 of spaced spectral response. A suitable commercially available version of the transducer 13 is known as the Sharp PD 150 color sensor which contains a first photodiode exhibiting a peak response at 600 nm and a second photodiode having a peak response at 875 nm. The photodiodes are thus sensitive to radiation in the infra-red wavelengths as well as the visible wavelengths.

When light falls on the color sensor the photodiodes 18, 19 each produce an output, the outputs being different by virtue of the different spectral responses of the photodiodes. As is evident from FIG. 2a the outputs of the two photodiodes 18, 19 are supplied to respective log amplifiers 21, 22 the resultant signals from which are fed to a subtracting circuit 23. The output of the circuit 23 represents a logarithm of the ratio of the signals derived from the photodiodes 18, 19 and conveniently is processed by a peak-to-peak threshold detector 24 before being passed to an engine control or engine management system. As combustion commences in the cylinder of an engine there is a very rapid temperature increase, and thus there is an equally rapid change of "color" of the "light" emitted. It is to be understood that references to "color" and "light" are not to be construed as restricted to emissions in the visible wavelengths.

It will be recognized therefore that there is a very rapid rise in the ratio signal output by circuit 23 representative of the start of combustion. The rise in the ratio signal is considerably more rapid than the rise in an intensity signal derived from the same combustion event for example as disclosed by U.S. Pat. No. 4,381,748, and thus provides much more accurate timing information.

In a system as disclosed in U.S. Pat. No. 4,381,748 it is necessary to average the peak intensity over a predetermined number of engine cycles in order to overcome the relatively wide variation in engine cycle to engine cycle peak combustion light intensity. It has been found that ratio signal issuing from circuit 23 does not exhibit a marked peak to peak variation and therefore it is necessary only to pass the signal through a low pass filter in order to derive a control signal by which the control of, say the point of ignition spark generation within the engine cycle, may be effected.

Figure 2B:
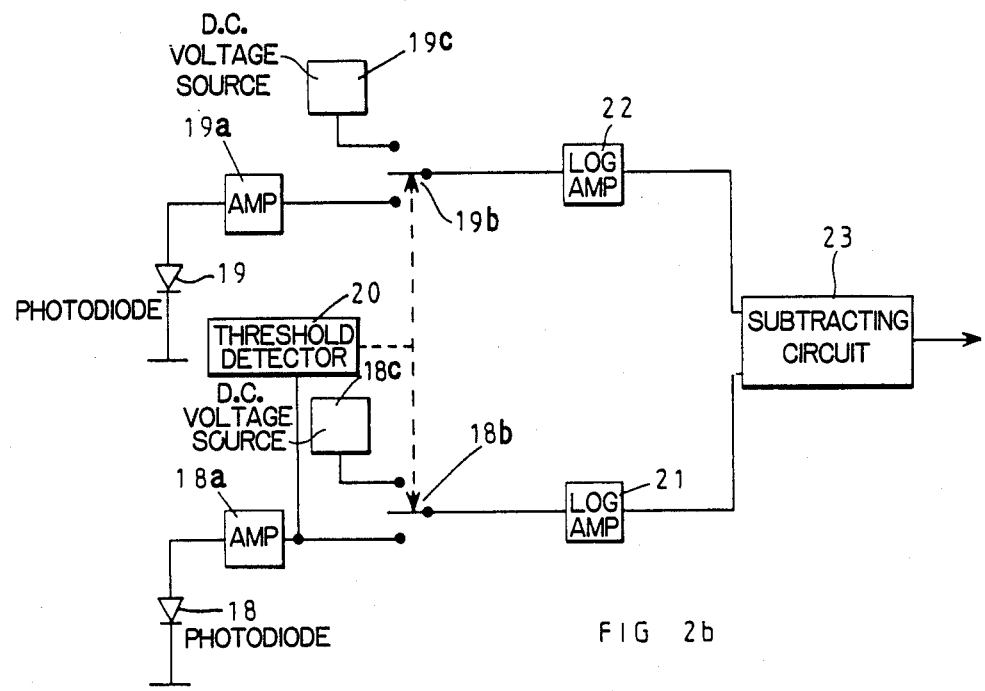
FIG. 2b is a diagram, similar to FIG. 2a, of a modification.

When the output signals of the photodiodes 18, 19 are very small, as may be the case when the engine operates under low load, the output of the respective logarithmic amplifiers 21, 22 may become inaccurate and so give rise to a distorted ratio signal from the circuit 23. In order to minimize this risk the arrangement shown in FIG. 2b is proposed. In FIG. 2b the output of each photodiode is amplified at 18a, 19a and is supplied to one input of a respective electronic change-over switch 18b, 19b. The other input of each switch 18b, 19b is maintained at a predetermined d.c. voltage by a respective d.c. source 18c, 19c. The output of each switch 18b, 19b is fed via a respective log amplifier 21, 22 to a subtracting circuit 23 as before.

The electronic switches 18b, 19b are electronically ganged and are controlled by a threshold detector 20 sensitive to the level of the output signal of the amplifier of one of the photodiodes 18, 19 (the photodiode 18 being chosen in FIG. 2b). In effect the additions to the system of FIG. 2a incorporate a noise gate or "squelch"

circuit into the system. When the signal from photodiode 18 falls below a threshold predetermined at detector 20, the switches 18a, 19b operate to supply the constant, preset d.c. signals from 18c, 19c to the log amplifiers 21, 22 in place of the signals from the photodiodes 18, 19. The d.c. signals from 18c, 19c are so chosen as to provide a ratio signal at the output of circuit 23 similar in level to that which should be obtained with low signals from the photodiodes, but of course since the d.c. signals are constant then the output at 23 is more stable than would be obtained from low photodiode signals. When the output signal from photodiode 18 rises above the threshold value the switches 18b, 19b change-over so that the photodiode signals are applied to the log amplifiers 21, 22. Thus the effect of the noise gate is to minimize the risk that at low photodiode output levels the output of the circuit 23 will be a misleading output derived from system noise rather than low level but genuine photodiode signals.

The amplifiers 18a, 19a are transimpedance amplifiers conveniently based upon National Semiconductor L.F. 355 operational amplifiers. The d.c. sources 18c, 19c may be fixed or variable resistors reducing the voltage from a system supply rail to a predetermined acceptable voltage. Conveniently the threshold detector 20 is based upon a National Semiconductors L.M. 339 comparator, the threshold value of which is adjustable by a potentiometer. Suitable electronic switches 18b, 19b are available as Siliconix D.G. 211.

FIG. 3b illustrates graphically the effect of the noise gate. The upper curve of FIG. 3b illustrates the signal at the output of the circuit 23 in a system not equipped with the noise gate, while the lower curve illustrates the signal at the output of circuit 23 in a system having a noise gate and under the same input conditions. It can be seen that the start of combustion (x on the curves) is considerably more clearly defined in the lower curve.

Inherently therefore the response of a system utilizing the ratio of the outputs of a pair of spectrally spaced detectors is significantly more rapid than that of the system of the kind disclosed in U.S. Pat. No. 4,381,748. Moreover, a system utilizing the ratio of the signals from a pair of detectors of spaced spectral response is considerably less sensitive to light attenuation arising from contamination of the "window" through which the combustion event is viewed. Although "window contamination" does not constitute a true neutral density filter, it can, in many circumstances approximate to a neutral density filter, and this of course will not affect the ratio derived from the circuit 23 whereas it would affect the intensity measurement produced by the system of U.S. Pat. No. 4,381,748. It follows therefore that the sharp onset of the "color signal" perceived by the transducer assembly 13 and its associated circuitry provides an ideal control signal for passing the start of combustion parameter to an engine control system, the control signal being one which does not require knowledge of previous combustion events to provide a threshold level at which the signal is passed to the engine control system. In some applications for example where signal strength is low in relation to noise on the signal it is preferable to use the peak-to-peak threshold detector 24 in order to derive a control signal to be passed to the engine control system. As an alternative a comparator, for example Schmidt trigger arrangement, could be used to observe the signal and to produce an output when the value of the signal exceeds a predetermined reference value. As yet a further alternative the signal could be differentiated in the microprocessor control of the system which then looks for a predetermined value of gradient and yes its existence to signify the start of combustion. While in the above example the signal representing the ratio is in the form of the logarithm of the ratio it will be appreciated that this is simply for convenience of electrical processing.

When used in association with a self igniting reciprocating piston internal combustion engine (for example a diesel engine) the derived control signal may be used by the engine control system to determine the point in the rotation of the crank-shaft of the engine at which fuel is injected into the respective cylinder of the engine. If desired each cylinder of a multi-cylinder engine could be similarly monitored, although more probably the parameters monitored in one cylinder will be used to produce a control signal for all cylinders.

Figure 3A:
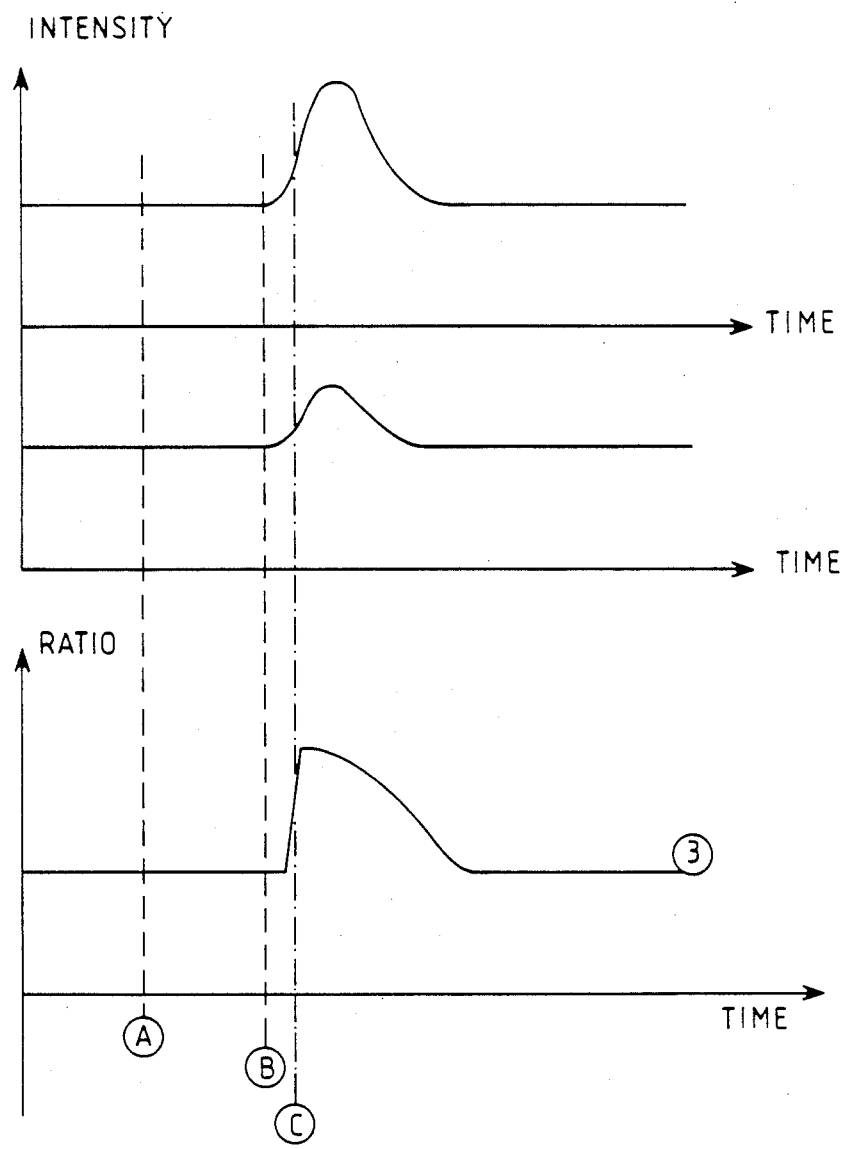
FIG. 3a is a graphic illustration of the outputs of the optical transducer and the ratio of those outputs in a diesel engine.

FIG. 3a illustrates graphically the signals produced by the photodiodes 18, 19 (curves 1 and 2 respectively) when "viewing" a single combustion event. The corresponding ratio signal produced by the circuit 23 is represented by curve 3. It can be seen that curve 3 exhibits an extremely steep leading edge and a marked peak and thus provides an ideal waveform for determining the start of combustion. Vertical line A in FIG. 3a represents a datum point within the rotation of the crank-shaft and in so far as the engine control system is concerned a corresponding datum signal may be supplied from a crank-shaft angle transducer of known form. Vertical line B represents the point at which fuel is injected into the cylinder, and the timing between A and B is controlled by the engine control system in accordance with the control signal representing start of combustion. Vertical line C represents the start of combustion signal which in practice is determined as mentioned above. The spacing between line B and line C reflects the delay between injection of fuel into the cylinder and combustion reaching a point at which the start of combustion signal is generated.

Having determined the point in crank-shaft rotation, relative to the datum, at which combustion has commenced in one cycle, the point at which fuel is injected in the next cycle can be adjusted to the optimum point in relation to the crank-shaft datum. It would be recognized that the delay period between injection and start of combustion will depend upon fuel quality and other factors such as the fuel spray pattern, the cylinder temperature, and the presence of residual gases either through inefficient purging of the cylinder, or through deliberate recirculation of exhaust gases. The optimum point of start of combustion will be known, and by comparing the actual start of combustion with the known optimum, the subsequent injection of fuel in the next cycle can be timed such that start of combustion occurs at the optimum point. Measurement of the peak height of curve 3 may be considered as a measurement of peak temperature, and this parameter could be used in the control system of a diesel engine.

Figure 5:
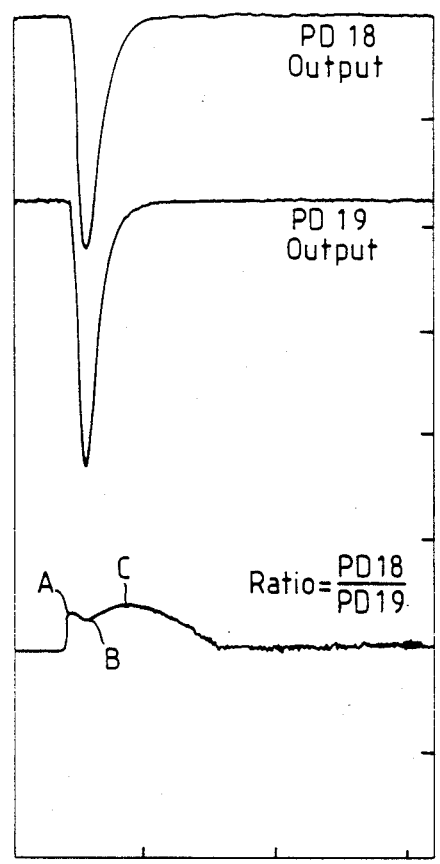
FIG. 5 is a view similar to FIG. 3 illustrating petrol (i.e. gasoline) engine characteristics, and, FIG. 6 is a view similar to FIG. 5 illustrating a single photodiode output under "knock" conditions.

Similar monitoring of the combustion event can be applied to a spark ignition reciprocating piston internal combustion engine (a petrol i.e. gasoline engine) where the combustion monitoring can provide information for the control of many more parameters than would normally be concerned in the control of a diesel engine. Basically the engine management system of a petrol/gasoline engine will control the spark timing and the fuel/air mixture ratio. It has been previously proposed to use a start of combustion signal in a petrol/gasoline engine as a control parameter for determining spark timing. Previous proposals have suggested monitoring cylinder pressure of cylinder temperature to achieve a start of combustion signal, but as described above in relation to a diesel engine a control signal derived from the ratio of the outputs of a pair of spectrally spaced optical detectors has significant advantages. It has previously been proposed to control fuel/air mixture on the basis of exhaust gas analysis, but of course this is a relatively slow response system, and necessitates the use of complex and therefore expensive exhaust gas analysis equipment. It has been determined however, that the color ratio signal derived from a color sensor as described above exhibits a well defined envelope as shown in FIG. 5, comprising an initial rise to a first peak A, followed by a falling characteristic reaching a minimum B, before rising again to a further, less well defined, peak C. The magnitude of a ratio at point B is found to correlate very closely with the proportion of oxides of nitrogen (NOx) in the exhaust emission of the engine. This correlation is particularly useful in the so called "lean-burn" operating conditions of a petrol/gasoline engine and thus the ratio signal derived from the outputs of the color sensor can be considered as a measure of the NOx emissions of the engine, and thus can be used as a control parameter in a closed loop feed-back system controlling the fuel/air mixture supplied to the engine. It will be appreciated that the two upper curves of FIG. 5 are each the outputs from the associated photodiodes 18,19 respectively.

Figure 6:
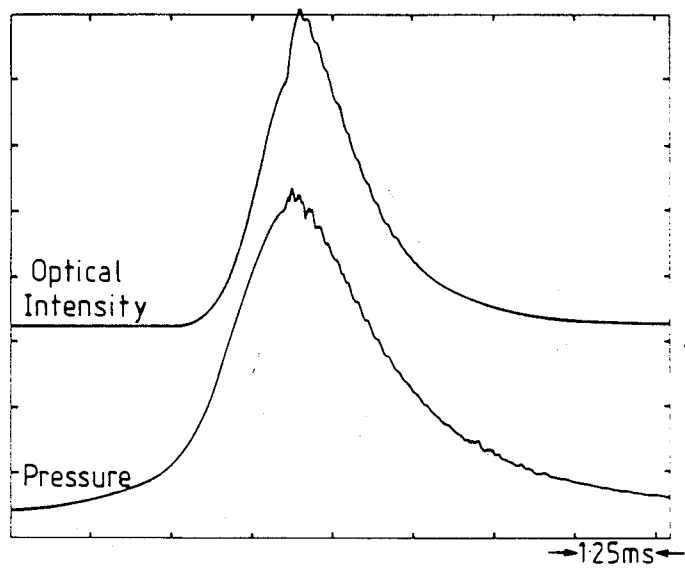

Other parameters of interest in engine management are the "quality of combustion", both in terms of "abnormal combustion" events or the increasing cyclic variability in work output, known as "roughness", that occurs as the engine air/fuel approaches the lean misfire limit, and the onset of "knock". Both the "quality of combustion" and "knock" are observable in the signal patterns of the two optical devices of the color sensor. Both conditions give rise to detectable and recognizable differences from the norm in the light intensity signal produced by each photodiode. FIG. 6 shows the characteristics of a "knock" signal comprising a fast rising leading edge followed by an oscillating decay (upper curve) and for comparison the cylinder pressure curve (lower curve) of the same combustion event. Abnormal combustion or "roughness" may be measured by monitoring the point at which the peak light intensity signal produced by either photodiode occurs within the engine cycle over a number, of engine cycles. A measure of the "roughness" of the engine operation may then be obtained by observing the statistical variation of this signal over the sample number of cycles. Conveniently this may be done by observing the standard deviation, this being a function of the cyclic variability within the combustion process (as "roughness" increases standard deviation increases). Thus although these parameters are monitored in terms of the light intensity, rather than the ratio signal derived by comparing the outputs of both photodiodes, it is nevertheless convenient to include the monitoring of such parameters in an overall monitoring system since all that is necessary is to consider the signals from one or the other photodiode in order to determine the onset of knock or abnormalities in the combustion process.

FIG. 4 illustrates in diagrammatic form a convenient monitoring system for supplying control parameters to a petrol/gasoline engine management system. The photodiodes 18, 19 produce individual output signals which are amplified by the respective log amplifiers 21, 22 and which are passed to a subtraction circuit 23. Subtraction circuit 23 is fed from a threshold circuit 30 which responds to the existence of a real light intensity signal (in this case photodiode 18). This signal serves to gate circuit 23 to a peak detector circuit 31, which- determines the minimum value equivalent to point B of FIG. 5. It will be appreciated that the envelope in FIG. 5 is a true ratio, while the output of circuit 23 is the logarithm of the ratio and so is a compressed version. The magnitude of the signal from peak detector 31 is representative of the amount of NOx emitted from the engine exhaust.

In addition the output of the photodiode 18 after amplification in amplifier 18a is passed to the frequency analyzer/filter circuit of 36, the output of which is a measure of the amplitude of the oscillatory decay part of the photodiode signal when the engine is "knocking". The output of photodiode 18 is also passed to the "roughness" detection circuit 38. The circuit 38 is also supplied with the engine speed 33, and a marker signal 34, representing a fixed point in the engine cycle. The output of circuit 38 is representative of the point in the combustion cycle at which the peak light intensity occurs. The circuit 39, is fed with both the amplified output of photodiode 18 and the marker 34, and recognizes the multiple combustion peaks representative of abnormal combustion. The output of the peak detector 31 is supplied to the timing circuit 32 which is also supplied with an engine speed signal 33, and the crank marker signal 34. The output of this circuit is the crank angle at which the combustion commences.

The output of circuits 32, 38, 39, 31 and 36 may each be supplied to the microprocessor 37 and used for the control of engine parameters.

Figure 7:
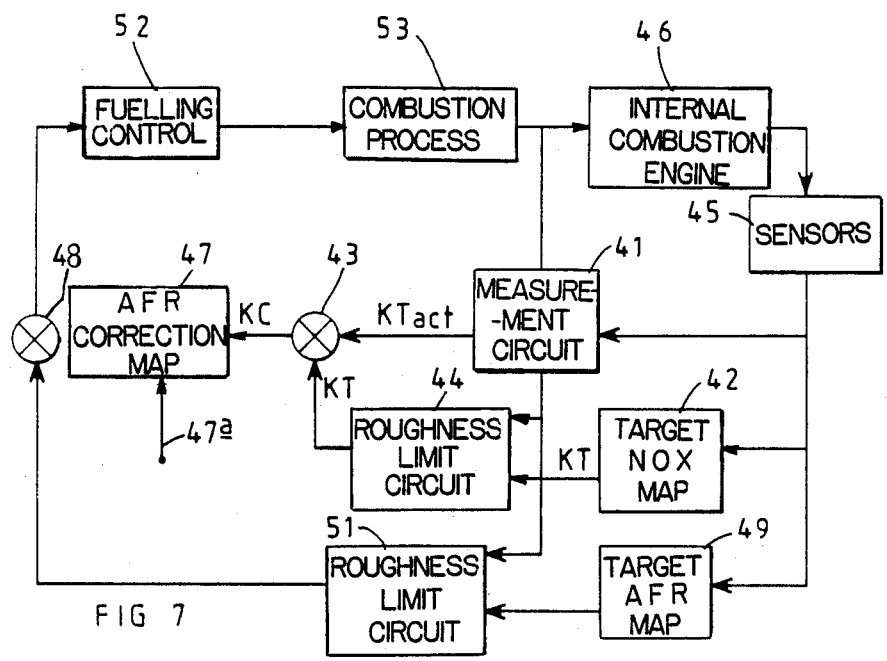
FIG. 7 is an illustration of the control of air fuel ratio in an engine, and, FIG. 8 is a view similar to FIG. 7 but illustrating control of ignition timing.

FIG. 7 provides an illustration of the control of Air Fuel Ratio (A.F.R.) in an internal combustion engine. The internal combustion engine is illustrated in FIg. 7 as item 46 and it incorporates a plurality of sensors 45 which provide output signals representative of rotational speed, crank shaft angle, and engine load. The combustion process is indicated in FIG. 7 by item 53 and the light output of the combustion process is supplied to a measurement circuit in the manner described above. The measurement circuit is indicated at 41 and actually comprises parts of the circuit described above with reference to FIG. 4. We have described above how a signal representative of NOx is derived, and this signal is output by the measurement circuit 41 as signal KTact. A summing point 43 subtracts KTact from a reference signal KT derived from a three dimensional map 42 stored in the memory of the system, to produce an error signal KC. Predetermined locations of the map 42 are referenced by speed and load signals applied thereto from the sensors 45. The output signal from the map 42, dependent upon the input speed and load signals, is supplied by way of a roughness limit circuit 44 to the summing point 43. The error signal KC is fed to an A.F.R. correction map 47. As with the map 42, the map 47 is stored in memory and locations thereof are referenced by speed and load signals from the sensors 45, applied by way of an input line 47a. The resultant output from the A.F.R. correction map 47 is summed, at a summing point 48, with a reference value derived from an A.F.R. map 49 again stored in memory. As with the other maps, locations of the A.F.R. map 49 are referenced by speed and load signals from the sensors 45 and the output of the map 49 is processed by a roughness limit circuit 51 before being fed to the summing point 48.

The output from the summing point 48 is a corrected A.F.R. signal which is then applied to the fueling control arrangement 52 of the engine 46. While the sensors 45 supply speed and load signals to the maps 42 and 49, they supply signals representative of speed and crank shaft angle to the measurement circuit 41. The "target" maps, that is to say the map 49 of air fuel ratio, and the map 42 of NOx are established in advance by the engine designer. The system illustrated in FIG. 7 provides a means by which the target value of NOx can be maintained in the presence of engine to-engine and day to day variability. It is recognized that a very substantial cycle to cycle variation in NOx production occurs, and thus to obtain a representative control signal the system, which is a microprocessor system, will filter the output of circuit 31 in FIG. 4. It will be recognized that NOx control is achieved without the need for exhaust gas analysis.

Within a lean burn control system of an internal combustion engine it is necessary to control the air fuel ratio to a value close to the lean misfire limit. The outputs of the "roughness" detection circuit 38 in FIG. 4 and the abnormal combustion circuit 39 also shown in FIG. 4, are used to alter the output values of A.F.R. and KT applied to the summing points 48 and 43 respectively in the direction of enrichment. Such enrichment is proportional to the magnitude of the "roughness" or "abnormal combustion" signals. The "roughness" signal is employed by noting the statistical spread of the signal since this is representative of the cyclic variability in the combustion process. As the engine fueling approaches the lean misfire limit the standard deviation of the point of peak intensity within the combustion cycle (the output of circuit 38) increases.

Figure 8:
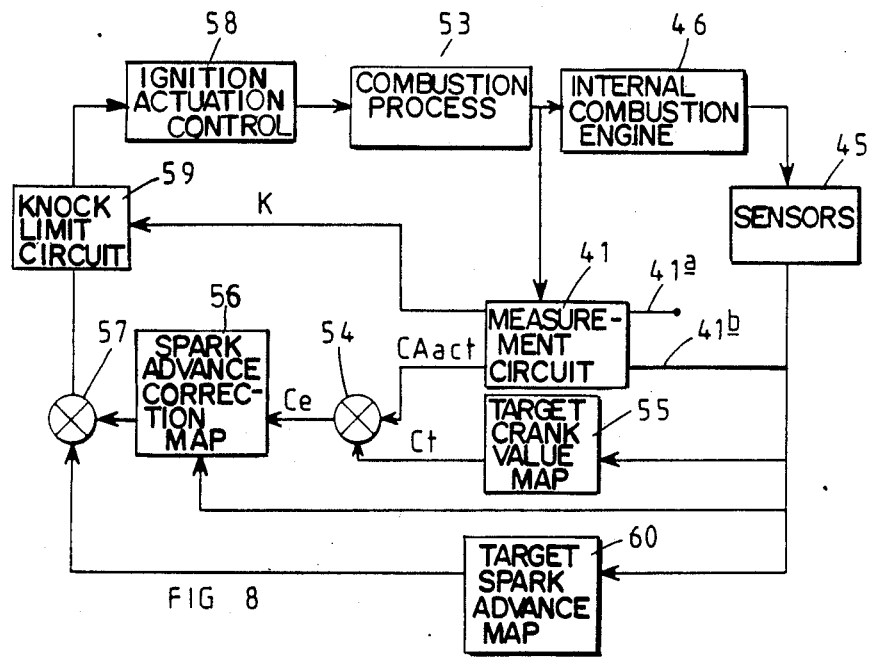

FIG. 8 is illustrative of the control of spark advance in an internal combustion engine. The actual crank angle at which the start of combustion occurs will be referred to as CAact and is determined by the measurement circuit 41 previously referred to with reference to FIG. 7. The engine 46 includes sensors 45 which supply a signal representative of crank shaft angle to the circuit 41 by way of an input 41a and a crank shaft rotational speed signal by way of input 41b. CAact is summed at a summing point 54 with a target signal derived from a stored three dimensional map 55 of target crank angle values, locations of the map 55 being referenced by speed and load signals derived from the sensors 45. The error signal Ce derived from the summing point 54 is supplied to a stored spark advance correction map 56 again referenced by speed and load signals from the sensors 45. The correction signal from the map 56 is summed at a summing point 57 with a target value for spark advance derived from a stored three dimensional map 60 is of target spark advance which again is referenced by speed and load signals from the sensor 45. The output from the summing point 57 is the spark advance signal to be applied to the ignition actuation control 58 of the engine to control the start of combustion at 53. However, in order to accommodate the possibility of a "knock" condition the "knock" detection circuit previously described is used to apply an input signal K to a knock limiting circuit 59 which processes the output of the summing point 57 before it is applied to the control 58. In the event that a "knock" state exists then the circuit 59 applies a fixed retardation value to the spark advance signal being applied to the control 58.

It will be recognized therefore that a single color sensor embodying a pair of spectrally spaced optical detectors can be used to monitor combustion within the cylinder of an engine, and thereby to provide control parameters controlling an engine management system in response to a number of different criteria, each of the criteria being determined from changes in the "light" emissions of the combustion event. Utilizing parameters derived from the ratio of the outputs of a pair of spectrally spaced optical detectors overcomes many of the problems suffered by previously proposed intensity detectors, and since an intensity signal is available from either of the optical detectors then additional control parameters not easily derived from the ratio signal can be taken from the output of only one of the detectors.

It will be recognized that the physical construction of the monitoring probe can take a wide variety of different forms, but it is considered that it may be convenient to incorporate such a monitoring probe into the construction of the spark plug of a petrol/gasoline engine or the glow plug of a diesel engine. With such an arrangement each cylinder could be individually monitored and while it may be possible to incorporate the color sensor into each spark plug it is currently considered preferable to transmit the optical information by fiber optics or the like to a remote location so that the color sensors are not subject to the aggressive environment which exists closely adjacent an engine. Moreover, where each cylinder of an engine is equipped with an optical probe, either by virtue of a modified spark plug, or by means of a probe separate from the spark plug, it may well be possible to monitor each probe in turn with the same color sensor. The onset of combustion in each cylinder is of course spaced in time from the onset of combustion in the other cylinders, and thus it may be possible to obtain a system response which is sufficiently rapid for a single color sensor, linked to each of the probes by fiber optic devices, to discriminate between the individual combustion events of the cylinders of the engine.

We claim:

1. A method of monitoring combustion within a cylinder of a reciprocating piston internal combustion engine comprising deriving first and second intensity signals representative of light intensity within the cylinder by means of first and second optical transducers of spaced spectral response, said first and second optical transducers observing the combustion event at a common location, or at closely adjacent locations, establishing a ratio signal representing the ratio of said first and second intensity signals and having a fast rising leading edge, and using said fast rising leading edge of said ratio signal as, or to obtain, a control parameter for controlling at least one engine function by an engine control system.

2. A method as claimed in claim 1 wherein said control parameter is derived from the differential of said ratio signal.

3. A method as claimed in claim 1 wherein said control parameter is obtained by observing when the value of said ratio signal exceeds a predetermined value.

4. A method as claimed in claim 1 wherein in said engine is a compression ignition engine (self-igniting/diesel engine) and the function which is controlled is the point in the engine cycle at which fuel is injected into the cylinder.

5. A method as claimed in claim 3 wherein the engine is a spark ignition engine and the engine function which is controlled is the air/fuel ratio of the engine.

6. A method as claimed in claim 5 wherein an additional controlled function is the point in the engine cycle at which the ignition spark is generated.

7. A method as claimed in claim 5 wherein said ratio signal exhibits a minimum immediately following a peak of the fast rising leading edge thereof, and said minimum is used to effect control over the air/fuel ratio of the engine.

8. A method as claimed in claim 1 wherein said ratio signal is a logarithm of the ratio of said first and second intensity signals.

9. A method as claimed in claim 4 wherein said signal representing said ratio is a logarithm of the ratio.

10. A method as claimed in claim 5 wherein said ratio signal is a logarithm of the ratio of said first and second intensity signals.

11. A method as claimed in claim 6 wherein said ratio signal is a logarithm of the ratio of said first and second intensity signals.

12. A method of monitoring the oxides of nitrogen (NOx) content of the exhaust of a reciprocating piston internal combustion engine including monitoring light intensity within the cylinder, deriving first and second electrical signals representative of light intensity within the cylinder by means of first and second optical transducers of spaced spectral response, said first and second optical transducers observing the combustion event at a common location, or at closely adjacent locations, and, establishing a signal representing the ratio of said first and second electrical signals, said ratio signal being used as, or to obtain, a control parameter for an engine control system.

13. Apparatus for monitoring the oxides of nitrogen (NOx) content of the exhaust of a reciprocating piston internal combustion engine, the apparatus comprising light conduction means having one end exposed within the combustion chamber of the cylinder of an internal combustion engine, and its opposite end communicating with sensor means comprising first and second optical transducers of spaced spectral response for providing respective first and second intensity signals, and, means for establishing a signal representing the ratio of the first and second intensity signals produced by said first and second transducers, and for producing an output signal derived from said ratio signal.

14. Apparatus as claimed in claim 13 wherein said ratio signal is a logarithm of the ratio of said first and second intensity signals.

* * * * *